United States Patent [19]

Graham et al.

[11] Patent Number: 5,417,825

[45] Date of Patent: May 23, 1995

[54] METHOD FOR PHOTOTHERMAL DESTRUCTION OF TOXIC ORGANIC COMPOUNDS

[75] Inventors: John L. Graham, Kettering; H. Barrett Dellinger, Spring Valley, both of Ohio

[73] Assignee: University of Dayton, Dayton, Ohio

[21] Appl. No.: 54,388

[22] Filed: Apr. 28, 1993

[51] Int. Cl.$^6$ ............................................. C07B 63/00
[52] U.S. Cl. ........................ 204/158.2; 204/158.21; 204/157.61; 588/207; 588/210; 588/212; 588/227
[58] Field of Search ........... 204/158.2, 158.21, 157.61; 588/207, 210, 212, 227

[56] References Cited

U.S. PATENT DOCUMENTS

| | | | |
|---|---|---|---|
| 3,977,952 | 8/1976 | Knoevenagel et al. | 204/157.1 R |
| 3,984,296 | 10/1976 | Richards | 204/157.1 R |
| 4,045,316 | 8/1977 | Legan | 204/158 R |
| 4,210,503 | 7/1980 | Confer | 204/158 R |
| 4,432,344 | 2/1984 | Bennington et al. | 588/227 |
| 4,549,528 | 10/1985 | Gibson | 588/210 |
| 4,816,145 | 3/1989 | Goudy, Jr. | 210/96.1 |
| 4,857,277 | 8/1989 | Broomfield | 422/186.07 |
| 4,978,508 | 12/1990 | Hansen et al. | 422/186.08 |
| 4,981,650 | 1/1991 | Brown et al. | 422/24 |
| 5,045,288 | 9/1991 | Raupp et al. | 422/186.3 |

OTHER PUBLICATIONS

Berman et al, "High Temperature UV Absorption Characteristics of Three Environmentally Sensitive Compounds", J. Photothem. Photobiol. A: Chem., 68(1992) 353–362.

Graham et al, "Disposal of Toxic Wastes Using Concentrated Solar Radiation," Am. Chem. Soc., Chapt. 6, pp. 83–109, 1991.

Graham et al, "Solar Thermal/Photolytic Destruction of Hazardous Organic Wastes", Energy vol. 12, No. 3/4, pp. 303–310, 1987.

Graham et al "The High Temperature Thermal/Photolytic Oxidation of Monochlorobenzene," J. of Photochem. & Photobiology, A: Chem. 71 (1993) pp. 65–74.

Primary Examiner—T. Tung
Assistant Examiner—C. Delacroix-Muirheid
Attorney, Agent, or Firm—Killworth, Gottman, Hagan & Schaeff

[57] ABSTRACT

A method and apparatus for photothermal detoxification of toxic organic compound is provided. The apparatus includes a thermally insulated reaction vessel maintained at a temperature greater than 200° C., and a radiation source such as arc emission or a laser which irradiates the compound at a wavelength of less than 300 nm for at least 2 seconds to produce nontoxic reaction products.

8 Claims, 3 Drawing Sheets

METHOD FOR PHOTOTHERMAL DESTRUCTION OF TOXIC ORGANIC COMPOUNDS

BACKGROUND OF THE INVENTION

The present invention relates to a method and apparatus for photothermal destruction of toxic organic compounds, and more particularly, to a process which utilizes high temperatures in combination with radiation exposure to induce a photochemical reaction which completely detoxifies a wide variety of toxic organic compounds.

Throughout the industrialized world, there is a growing concern over the impact of industry on the environment, specifically with regard to the increasing emission of contaminants into the atmosphere. Of additional concern is the clean-up of extensive damage already done to specific sites and of the widespread contamination of ground water. According to recent estimates, between 330 and 570 million tons of hazardous waste were generated between 1900 and 1980, and 290 million tons of waste are now produced annually in the United States. The level of concentration of such wastes pose health hazards to the general population.

One method of controlling hazardous waste disposal has been high temperature incineration. Incineration is capable of breaking down a wide variety of toxic materials into carbon dioxide, water, and simple mineral acids. However, this process is very expensive and is inappropriate for many applications such as soil and ground water cleanup. In addition, public concern over emission of undestroyed residual components, organic products of incomplete combustion, and off-gas streams laden with organic vapors, have led to regulations by the Environmental Protection Agency, which now requires that incinerators possess a destruction and removal efficiency of 99.99% for the principal organic hazardous components in a waste stream.

Another method proposed for treating large volumes of toxic organic wastes has been the use of solar radiation. Sunlight contains both infrared radiation, which can be used to heat the waste, and ultraviolet radiation, which can promote photochemical reactions. However, the unreliability of solar energy limits its use in detoxification processes.

As a result, other more reliable sources of radiation such as high intensity ultraviolet lamps have been employed. For example, Confer, U.S. Pat. No. 4,210,503, uses ultraviolet lamps to irradiate a gas stream containing vinyl chloride, forming less hazardous materials which are then absorbed in a scrubber. However, Confer does not utilize heat in combination with the radiation, which slows down the detoxification reaction and limits the treatment capacity of the process.

Legan, U.S. Pat. No. 4,045,316 discloses a process for decontaminating gaseous or vaporous streams of vinyl chloride in which the streams are exposed to heat and radiation. However, relatively low temperatures (i.e., nearly ambient) are maintained during the process, which may result in incomplete mineralization of the organic components.

Thus, while prior art processes have utilized either heat or radiation to destroy hazardous wastes, none of the processes have used a combination of intense heat and radiation. Although some processes disclose the use of slightly elevated temperatures as well as radiation, such slightly elevated temperatures are a physical requirement, e.g., for the purpose of preventing moisture condensation, and do not effectively aid in the detoxification process itself.

Further, many prior art processes, such as those described above, are limited to the detoxification of oxidizable contaminants.

Accordingly, there is still a need in the art for a process which uses concentrated radiation in combination with high temperatures to effectively destroy a large number of toxic organic wastes without producing any harmful byproducts.

SUMMARY OF THE INVENTION

The present invention meets that need by providing a method and apparatus for photothermal detoxification of a variety of toxic organic compounds which completely mineralizes the organic components. According to one aspect of the present invention, an apparatus is provided for the photothermal detoxification of toxic organic compounds such as chlorinated solvents, PCBs, pesticides, and various other heteroatomic molecules. The apparatus preferably comprises a thermally insulated reaction vessel and means for maintaining the temperature of the reaction vessel at greater than 200° C. Preferably, such means comprises a furnace surrounding a reactor housed inside the vessel.

The apparatus also includes an inlet for introducing a toxic organic compound into the reaction vessel. In a preferred embodiment of the invention, the inlet includes means for heating the toxic organic compound as it is introduced into the reaction vessel.

The apparatus includes a source for exposing the toxic organic compound in the reaction vessel to radiation of a wavelength of less than 300 nm. In one embodiment of the invention, the radiation source comprises an arc lamp selected from the group consisting of xenon, mercury, and xenon-mercury. In an alternative embodiment, the radiation source comprises a pulsed or continuous laser. Other sources of ultraviolet light such as flash lamps may also be used.

The apparatus also includes an outlet for removing the reaction products from the reaction vessel. In one embodiment, the apparatus optionally includes a cryogenic trap interfaced with the outlet for collecting and concentrating the reaction products from the reaction vessel. The trap includes an outlet for release of the collected products to a gas chromatograph or other analytical equipment for analysis of the reaction products.

The present invention also includes a method for detoxification of a toxic organic compound, which includes the steps of heating the toxic organic compound to a temperature of greater than 200° C. such that the compound is in the gas phase, and then exposing the compound to radiation at a wavelength of less than about 300 nm for a period of time sufficient to convert the toxic organic compound to nontoxic reaction products. To obtain maximum destruction efficiency of a toxic compound, the compound is preferably heated to a temperature of between 600°–800° C. and is exposed to radiation of between about 185 and 290 nm for at least 2 seconds, and more preferably from about 2 to 10 seconds. For the embodiment utilizing an arc lamp, the radiation is preferably emitted at greater than about 5 W/cm². If a laser is used as the source, the radiation is preferably emitted at greater than about 0.1 W/cm².

The resulting nontoxic reaction products may then be emitted harmlessly to the atmosphere, or to a gas chromatograph or other analytical systems for analysis.

Accordingly, it is an object of the present invention to provide a method and apparatus for photothermal detoxification of toxic organic compounds. This, and other objects and advantages of the present invention, will become apparent from the following detailed description, the accompanying drawings, and the appended claims.

DETAILED DESCRIPTION OF THE PREFERRED EMBODIMENTS

The apparatus and method of the present invention differ from prior art processes which are designed to process liquids, such as contaminated water, at low temperatures. Under such conditions, the detoxification reactions proceed slowly, which severely limits the treatment capacity. In addition, units operating at lower temperatures are unable to reduce contaminants to completely mineralized products, and thus often require the addition of reactants such as hydrogen peroxide to assist in achieving the required levels of detoxification. The apparatus of the present invention, however, is to designed to process gas-phase streams at higher temperatures using a lower wavelength range, which allows the photochemical reaction to proceed at an extremely high rate and to complete conversion of a toxic compound to mineralized products. This photothermal exposure results in a fewer number of by-products having lower yield and lower molecular weights than the byproducts produced by lower temperature processes.

Figure 1:
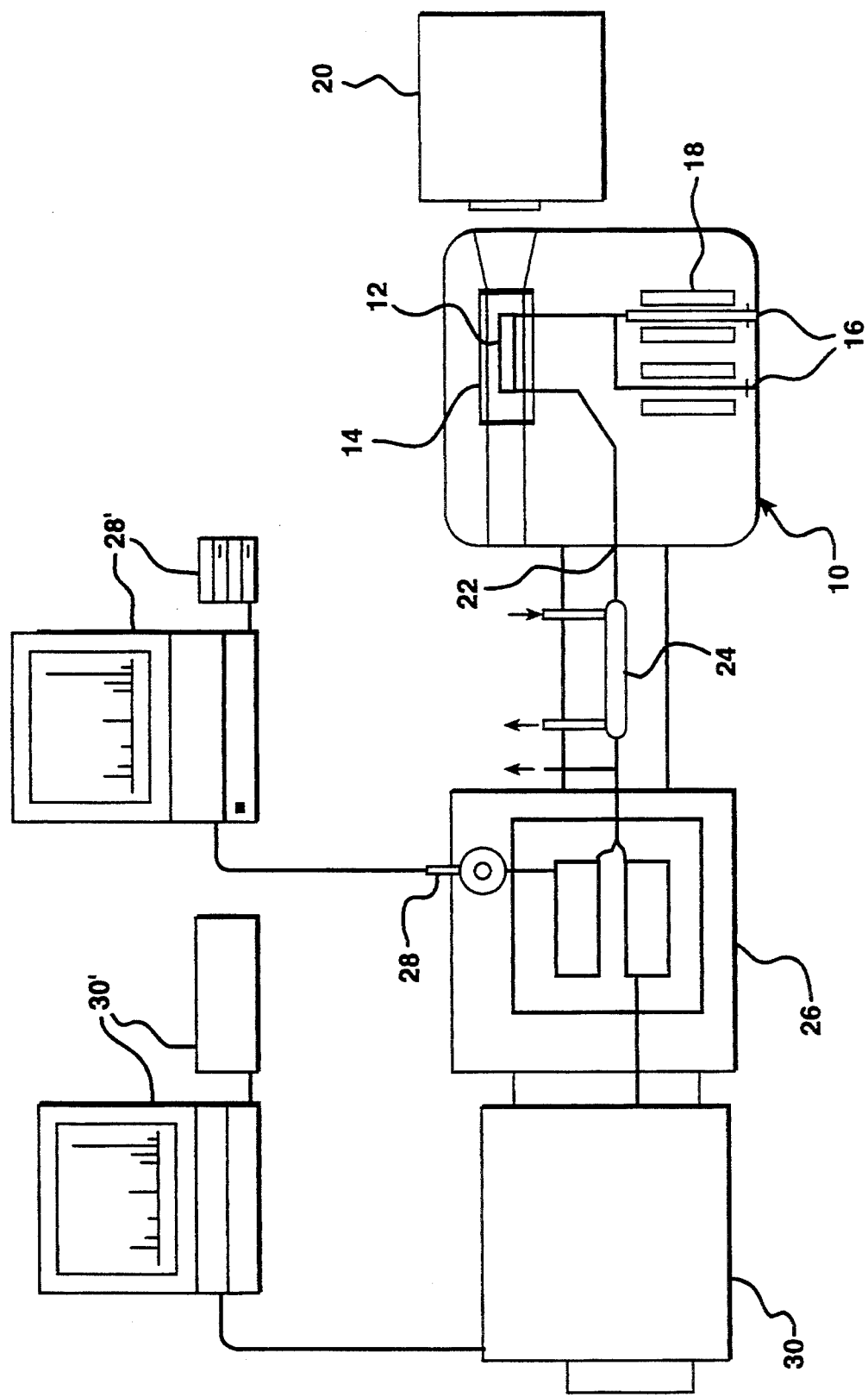
FIG. 1 is a schematic elevational view of one embodiment of the apparatus of the present invention.

Referring now to FIG. 1, one embodiment of the apparatus of the present invention is illustrated in schematic form. Inlets 16 are provided for introducing the toxic organic compound into the reaction vessel. The apparatus includes a thermally insulated enclosure 10 housing a reactor 12 and a small tube furnace 14. The reactor lies along the centerline of an open conduit that passes through the insulated enclosure in the apparatus. This passage permits the reactor to be illuminated with a radiation source 20. Heat is supplied by the furnace 14 which completely surrounds the reactor and is sealed at the ends by flat quartz windows to prevent convection currents from passing through the conduit. Optional inlet heaters 18 may be included in the apparatus to heat a sample compound as it is introduced into the reaction vessel.

The source of radiation 20 is located outside the reaction vessel and emits light through the quartz window of the reaction vessel. The radiation source may comprise arc emission such as xenon, mercury, or xenon-mercury lamps, or the source may comprise a pulsed or continuous laser. Such sources of radiation are capable of going further into the UV region than solar radiation, which results in greater efficiency of the detoxification reaction. Other available sources of ultraviolet light may be used as long as they provide the required radiation. The apparatus also includes an outlet 22 for removing the products from the reaction vessel after photothermal exposure. If analysis of the products is desired, the reactor outlet may be interfaced with a cryogenic trap 24 which collects and concentrates the reaction products for subsequent analysis as shown in FIG. 1. The trap is a separate, thermally controlled enclosure which is cooled using flowing nitrogen vapor. When all of the reaction products have passed through the reactor into the trap, the products may be heated and then released to a gas chromatograph 26 for analysis. The chromatograph may include a hydrogen flame ionization detector 28 for use in solute detection as well as a mass selective detector 30, along with associated recording means 28' and 30', as is well known in the art.

Preferably, a toxic organic compound is introduced into the reaction vessel through inlets 16. A sample of the compound may be introduced in gas, liquid, or solid form. The compound is then heated to a gaseous phase at a temperature of greater than 200° C., and more preferably at a temperature between 600°–800° C. The sample may be heated by the inlet heaters 18, by the furnace 14, or both. The compound is then subjected to radiation of less than 300 nm and more preferably at a radiation of between about 185–290 nm from the source 20 for at least than 2 seconds, and preferably from about 2 to 10 seconds.

If desired, the resulting reaction products may then be analyzed in the gas chromatograph or other analytical equipment.

Figure 2:
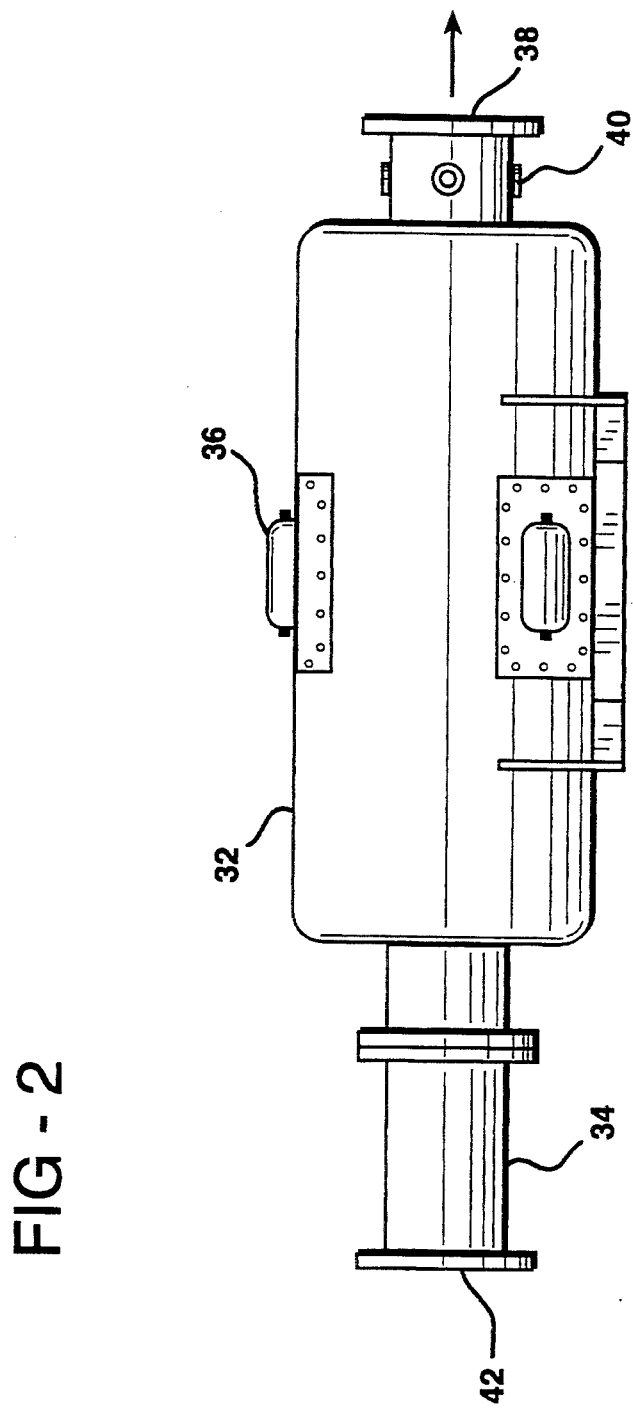
FIG. 2 is a schematic elevational view of another embodiment of the apparatus of the present invention.

An alternative embodiment of the apparatus is illustrated in FIG. 2 which comprises a thermally insulated reaction vessel 32, an inlet 42, radiation source 36, and an outlet or exhaust 38. In addition, a preheater 34 may be included to heat the sample compound as it is introduced into the reaction vessel. The apparatus optionally includes sampling ports 40 for collecting samples from the exhaust for analysis.

Because of its high efficiency, the apparatus of the present invention does not require the combustion of fuel, thereby reducing the production of combustion by-products and the need to process the additional gas volume generated by the use of those fuels. The apparatus may be used in processes which generate gas streams laden with organic wastes, such as soil detoxification, aeration stripping, incineration pollution control, or as a discrete unit operation in chemical processes which generate off-gas streams. In addition, the method and apparatus of the present invention may be used to detoxify a larger number of compounds than most prior art processes.

In order that the invention may be more readily understood, reference is made to the following examples, which are intended to illustrate the invention, but are not to be taken as limiting the scope thereof.

Example 1

Figure 3:
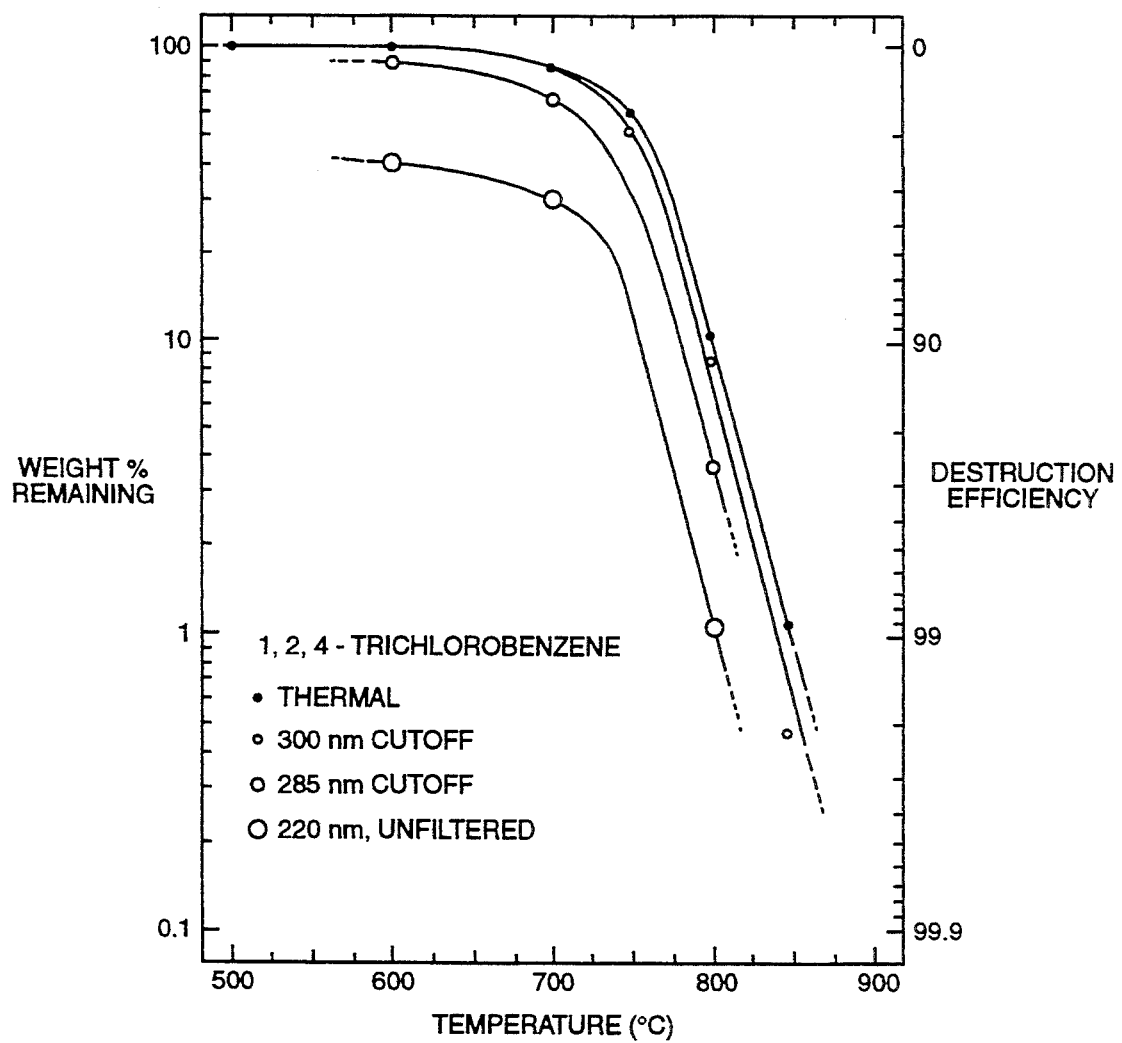
FIG. 3 is a graph illustrating the destruction efficiency of a toxic organic compound in accordance with the present invention.

1,2,4-trichlorobenzene was exposed in a reaction vessel for about 2.0 seconds in air using a low intensity xenon arc lamp of about 6 W/cm$^2$. FIG. 3 shows the decomposition data and destruction efficiency. As can be seen, the destruction efficiency increased as the illumination was lowered from 300 nm to between 220 and 285 nm and the temperature increased to between 600° and 800° C.

Example 2

Liquid chlorobenzene was treated in a gas-phase, oxidative environment with a high temperature flow reactor system. The radiation source was a tunable, pulsed laser system comprising a Nd:YAG laser (Continuum, Model 682-20) coupled to a dye laser (Continuum, Model TDL-51). The system was operated with 20 pulses/sec delivering an average power of 883 mW/cm$^2$ at 280 nm.

A sample of liquid chlorobenzene (Aldrich, 99.99% HPLC grade) was injected into a high-temperature absorption spectrophotometer at 0.209 μL/s. The cryogenic trap was cooled to −160° C. to collect the organic components of the reactor effluent. When the collection was complete, the trap was heated to 350° C., releasing the collected material to an in-line gas chromatograph for analysis. The gas chromatograph was fitted with a hydrogen flame ionization detector and mass selective detector (Hewlett-Packard, Model 5970) which was operated in a scanning mode (10 to 200 AMU).

The thermal and thermal/photolytic decomposition of chlorobenzene and associated carbon containing products are summarized in Table 1.

TABLE I

| | Temperature, °C. | | | | | | | | |
|---|---|---|---|---|---|---|---|---|---|
| | 300 | 400 | 500 | 600 | 650 | 675 | 690 | 700 | 710 |
| Chlorobenzene (Parent)[2] | 100 | 96.6 | 94.9 | 92.9 | 88.6 | 71.6 | 52.7 | 27.6 | 1.23 |
| Carbon monoxide | | | | | 45.9 | 138 | 388 | 488 | 573 |
| Carbon dioxide | | | | | 5.30 | 11.2 | 41.4 | 68.76 | 94.6 |
| 1-Butene-3-yne[3] | | | | 0.680 | 1.64 | 1.43 | 1.40 | 0.586 | |
| 1-Ethynyl-4-methyl-benzene[4] | | | | | 0.102 | 4.67 | 0.093 | 0.081 | |
| 2-Methyl-naphthalene[2] | | | | | 0.146 | 2.45 | 0.136 | | |
| 1-Methyl-naphthalene[2] | | | | | | 1.65 | 0.130 | | |
| 1-Propenyl-benzene[4] | | | | | | 1.34 | | | |
| 2-Chlorophenol[2] | | | | 0.165 | 1.33 | 1.90 | 1.36 | 0.327 | |
| 3-Chlorophenol[2] | | | | 0.106 | 1.49 | 1.84 | 1.33 | 0.284 | |
| Acenaphthene[2] | | | | | | 1.11 | | | |
| Benzene[2] | | | | | 0.239 | 0.735 | 0.689 | 0.248 | 0.141 |
| Naphthalene[2] | | | | | | 4.67 | | | |
| Phenol[2] | | | | 0.085 | 1.54 | 2.48 | 1.55 | 0.172 | |
| Total Carbon Recovered[5] | 100% | 96.6% | 94.9% | 93.3% | 103% | 131% | 131% | 122% | 113% |

[1]Mole % remaining of species i at temperature T = Moles $_T$(i)/Moles$_{300}$(ClBz) × 100%
[2]Quantified by analytical standard
[3]Quantified as butadiene
[4]Quantified as ethynylbenzene
[5]Sum of the total carbon measured in the output normalized by the total carbon input (5,343 nMol).

While certain representative embodiments and details have been shown for purposes of illustrating the invention, it will be apparent to those skilled in the art that various changes in the methods and apparatus disclosed herein may be made without departing from the scope of the invention, which is defined in the appended claims.

What is claimed is:

1. A thermal, photolytic process for the detoxification of chlorinated aromatic hydrocarbons comprising the steps of:
    heating said hydrocarbons to a temperature greater than 200° C. such that said toxic organic compound is in the gas phase, and
    exposing said hydrocarbons to radiation at wavelengths of less than 280 nm for at least two seconds, wherein said radiation originates from a non-solar source.

2. The process of claim 1 wherein said temperature is from 600° C.–800° C.

3. The process of claim 1 wherein said toxic organic compound is exposed to radiation at wavelengths from about 185 nm to 280 nm.

4. The process of claim 1 wherein said radiation is emitted from an arc lamp selected from the group consisting of xenon, mercury, and xenon-mercury.

5. The process of claim 4 wherein said radiation is emitted at greater than about 5 W/cm$^2$.

6. The process of claim 1 wherein said radiation is emitted from a pulsed or continuous laser.

7. The process of claim 6 wherein said radiation is emitted at greater than about 0.1 W/cm$^2$.

8. The process of claim 1 wherein said toxic organic compound is exposed to radiation for about 2 to 10 seconds.

* * * * *